Dec. 13, 1966     H. ULANET     3,291,956
ELECTRIC WELDING HEAD

Filed March 8, 1965     2 Sheets-Sheet 1

INVENTOR.
HERMAN ULANET

United States Patent Office 3,291,956
Patented Dec. 13, 1966

3,291,956
ELECTRIC WELDING HEAD
Herman Ulanet, Maplewood, N.J. (% George Ulanet Company, 413 Market St., Newark, N.J.)
Filed Mar. 8, 1965, Ser. No. 438,127
4 Claims. (Cl. 219—86)

On all electric resistance spot welders known to the art, the opposing welding electrodes or tips are fastened to the one end of a pair of heavy copper arms. The other ends of the copper arms are fastened to copper brackets which in turn are connected, by means of suitable flexible copper cables, to the terminals of the low voltage high current coil of the welding transformer. The copper brackets are of course insulated from the other structural parts of the spot welder by means of suitable insulation blocks.

However slight the welding pressure imparted at the electrodes during the welding operation there exists a slight deflection of the copper cantilever arms to which the electrodes are fastened. This condition in turn obviously destroys the original coaxial alignment of the welding electrodes and consequently varies the ohmic resistance of the piece parts that are being welded and varies the length of the path that the welding current travels. Changes of mechanical and electrical parameters are the major causes of non-uniform quality of the spot weld.

As repetitive welding operations are made permanent deformation of the cantilever arms takes place requiring repositioning and redressing of the copper welding electrodes to restore their original coaxial alignment. This corrective measure is required to assure that the welding current passes in a direction normal to the surfaces of the piece parts that are to be welded.

Without assurance of coaxial electrode alignment uniform quality of spot welds cannot be attained even if frequent adjustments are made in the welding time cycle, electrode pressure and welding current.

If a small precious metal contact is to be spot welded onto a switch blade at a precise position of the blade, the non-colinear alignment of the electrodes, due to the deflecting of the electrode arms the instant pressure is applied to the electrodes, has the tendency to push the contact laterally from the precise location on the switch blade where it was intended to be welded.

One object of my invention is to obviate deflection of electrode arms on spot welders to assure uniform quality of welds. Another object of my invention is a spot welder that will allow positive and accurate positioning and welding small contacts and the like to metal parts of large areas. The foregoing drawings and specifications will reveal the means for effecting the objectives of my invention.

Figures 1, 3:
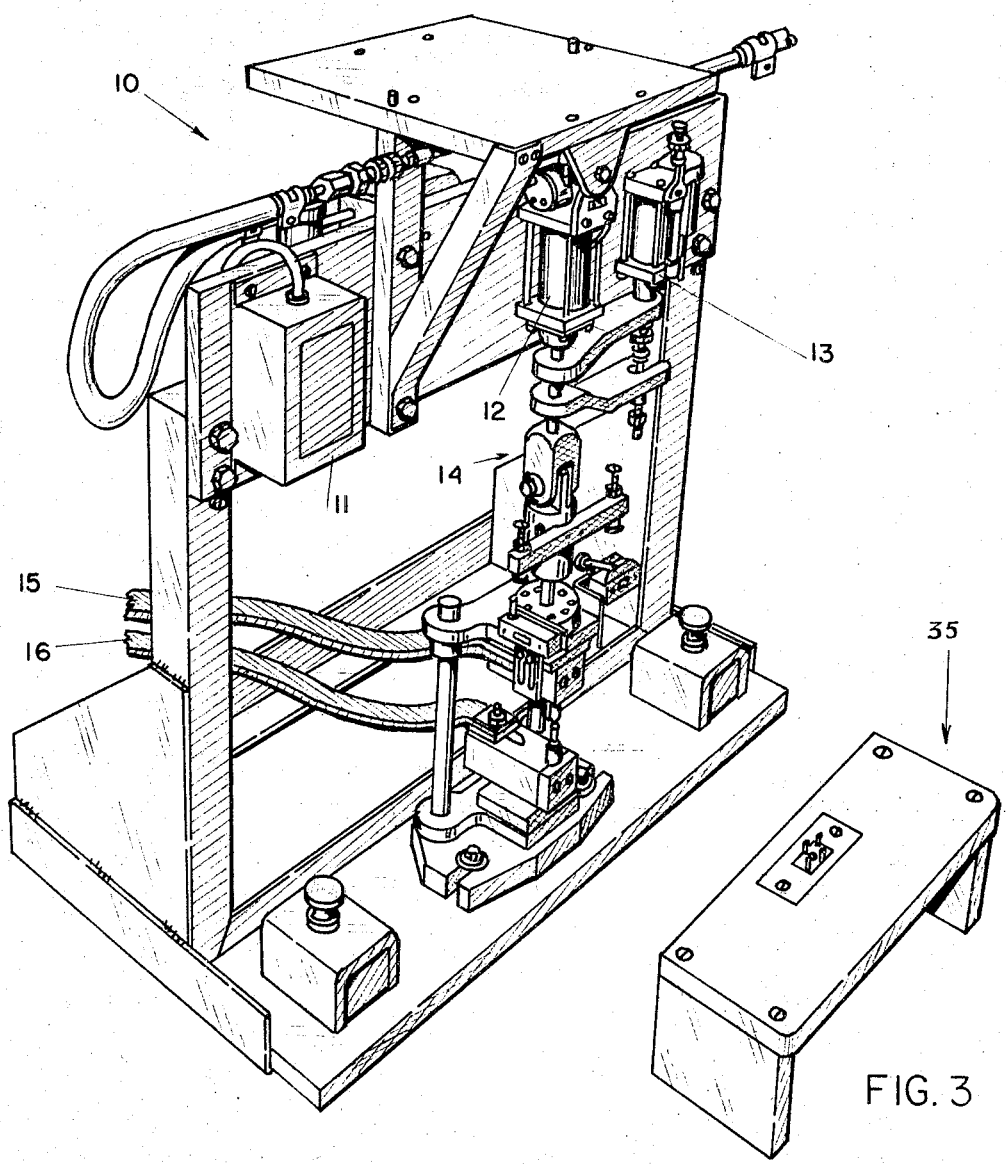

FIG. 1 illustrates the general structure of the spot welder. The welding transformer is not shown. Number 10 indicates the frame assembly of timer control and relay 11, for energizing the transformer and air cylinders 12 and 13 which actuates welding head assembly 14 up and down; 15 and 16 are heavy braided flexible cables, two ends of which are connected to the respective electrode holders 21 and 25 shown in FIG. 2 and the other ends are connected to the low voltage secondary of the welding transformer, not shown. In FIG. 3 is shown a device 35 which is a fixture used for locating a small contact and spring switch blade to be spot welded to each other.

Figure 2:
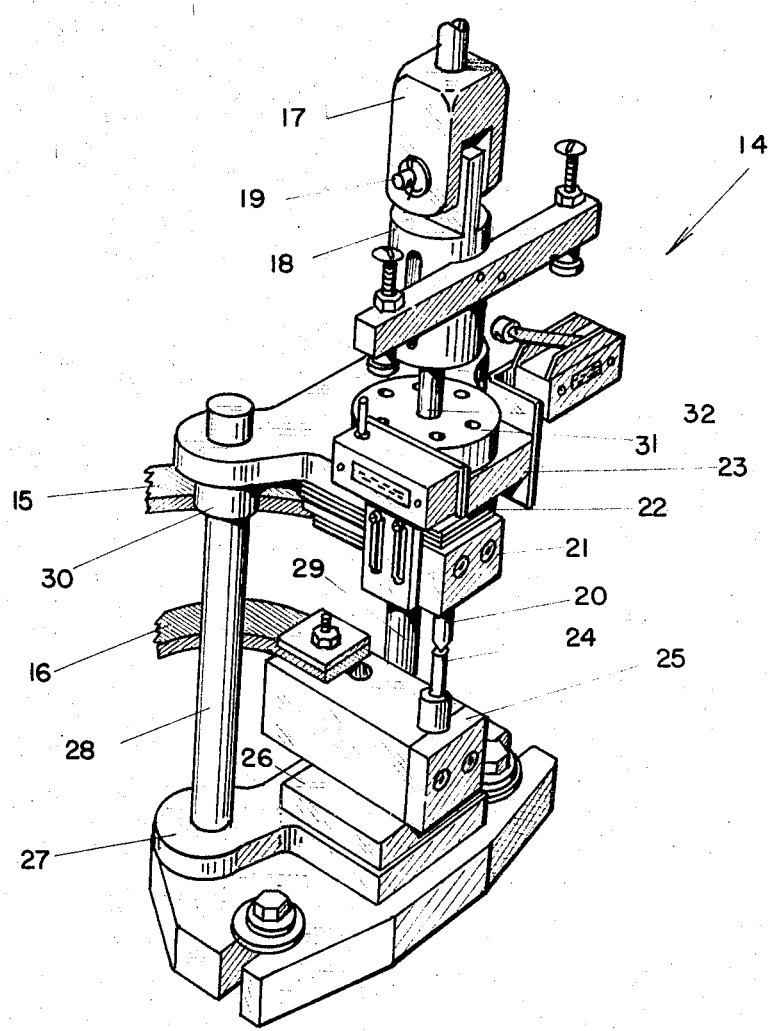

FIG. 2 shows more in detail the welding head 14 and pertains specifically to my invention.

Clevis 17, which is a composite part of the piston of air cylinder 12 shown in FIG. 1, is assembled to coupling 18 by means of shaft 19. Upper copper electrode 20 is inserted and clamped to copper electrode holder 21 which is fastened to upper cast iron plate 23 and electrically insulated therefrom by means of insulator block 22. Copper flexible cable 15 is connected to the rear end of electrode holder 21 and one of the terminals of the low voltage secondary winding of the welding transformer.

Lower electrode 24 is similarly inserted and clamped to lower electrode holder 25 in perpendicular relation. Lower electrode holder 25 is fastened to lower cast iron plate 27 and electrically insulated theerfrom by means of insulator block 26. One end of copper flexible cable 16 is fastened to the rear of lower electrode holder 25 in electrical conductive relationship therewith; and the other end to the second terminal of the secondary winding of the welding transformer, not shown. Thus an electrical circuit is completed through the low voltage high current secondary when piece parts to be welded are tightly held between electrodes 20 and 24 at the time the primary of the welding transformer is energized.

With precision machining and mounting, the electrodes 20 and 24 can be assured to be in perfect coaxial alignment. Furthermore, lower cast iron plate 27 is provided with 2 hardened and ground guide pins 28 and 29, the latter not fully shown in FIG. 2, perpendicular to itself. Upper cast iron plate 23 has 2 mating hardened and ground bushings 30. Only one is shown in FIG. 2. These bushings are in perfect coaxial alignment with hardened pins 28 and 29 and are a slip fit. It is understood that prior to assembly, both faces of cast iron plates 23 and 27 have been precision ground to assure parallelism.

The closely fitted hardened bushings and guide pins thus assure permanent coaxial alignment of electrodes 20 and 24 and prevents lateral movement of small piece parts such as a small precious metal contact of say .100″ dia. and .125″ wide spring switch blade when electrode welding pressure is applied.

To upper plate 23 is fastened an adapter 31 with a shank 32 which fits into a hole in coupling 18. Shank 32 is fastened to coupling 18 by suitable means. The welding head 14 could be mounted vertically, horizontally and at any angle to suit a given production set-up.

If bushings 30 were made of electrically non-conductive material, for instance, a fluorocarbon known as Teflon, insulating blocks 22 and 26 that insulate electrodes 20 and 24 respectively from cast iron plates 23 and 27 could be eliminated.

Besides, if guide pins 28 and 29 were made of a suitable electrical insulating material and the bushings 30 were made of metal, insulating blocks 22 and 26 could be dispensed with. Also both guide pins and bushings could be made of electrical non-conductors.

Means other than guide pins and bushings shown in FIGS. 1 and 2 could be adopted to assure coaxial alignment of welding electrodes 20 and 24. For instance, the plates 23 and 27 could have a periphery of any convenient geometric shape with opposing aprons that could be accurately machined so that one apron dovetails into the other apron with a slip fit, with minimum side play.

I claim:

1. In a welding head comprising coaxial and opposing co-acting electrodes, each electrode mounted at a right angle to substantially non-deflectable supporting metal plates and electrically insulated therefrom, guiding means for maintaining parallelism of said plates, means for connecting said electrodes in a welding circuit and means for engaging and disengaging said electrodes with components that are to be joined by welding and means for applying pressure on rigorously coaxial electrodes without disturbing their coaxiality by a measurable amount.

2. In a welding head as described in claim 1 wherein the substantially non-deflectable electrode supporting metal plates are provided with metal mating guide posts and bushings for maintaining mutual parallelism between said plates.

3. In a welding head as described in claim 2 wherein each electrode is mounted in electrical conductive relation with its respective supporting metal plate and wherein said supporting metal plates are provided with mating guide posts and bushings that are made of electrically non-conductive material.

4. In a welding head as described in claim 1 whereby the peripheries of the electrode supporting plates slideably mate with each other to maintain mutual parallelism between said plates.

References Cited by the Examiner

UNITED STATES PATENTS

| | | | |
|---|---|---|---|
| 2,253,702 | 8/1941 | Hall | 219—86 |
| 2,872,564 | 2/1959 | Du Fresne et al. | 219—86 |
| 2,951,932 | 9/1960 | Heckman et al. | 219—78 |
| 3,036,199 | 5/1962 | Page | 219—86 |

RICHARD M. WOOD, *Primary Examiner.*